Patented Oct. 1, 1946

2,408,391

UNITED STATES PATENT OFFICE 2,408,391

KETONE AMINOINDAN CONDENSATION PRODUCT

Carlin F. Gibbs, Cuyahoga Falls, Ohio, assignor to The B. F. Goodrich Company, New York, N. Y., a corporation of New York No Drawing. Application January 11, 1944, Serial No. 517,901

9 Claims. (Cl. 260—283)

This invention relates to new compositions of matter and pertains more specifically to the condensation products of ketones with aminoindans in which the amino group is directly attached to the aromatic nucleus.

These new compositions are useful as intermediates for the production of other organic compounds and as antioxidants. They may be used for the preservation of any organic substances which tend to deteriorate in the presence of oxygen, such as fish oils, linseed oil, tung oil, gasoline containing unsaturates, rubber, and the like. They are effective with any kinds of rubber such as caoutchouc, balata, gutta percha, latex, reclaimed rubber, artificial rubber isomers, and such synthetic rubbers as polychloroprene, copolymers of butadiene with acrylonitrile, styrene, methyl acrylate, methyl methacrylate, isobutylene, and other copolymerizable monomers. When used as antioxidants, my new compositions are effective in amounts ranging from 0.1 to 5% of the material to be preserved, although larger or smaller proportions may be used, depending upon the particular material to be preserved.

My new compositions are prepared by condensing one molecular proportion of a primary aminoindan in which the amino group is directly attached to the aromatic nucleus with a ketone in the presence of an acidic condensation catalyst, with the elimination of water. Various substituent groups such as alkyl, alkenyl, aryl, aralkyl, hydroxy, alkoxy, and aryloxy groups may be present on the indan ring in addition to the amino groups. Among the aminoindans which may be employed to form my new composition are 4-aminoindan, 5-aminoindan, 1-methyl-4-aminoindan, 2-methyl-4-aminoindan, 3-methyl-4-aminoindan, 1-methyl-5-aminoindan, 2-methyl-5-aminoindan, 3-methyl-5-aminoindan, 4-methyl-5-aminoindan, 4-hydroxy-5-aminoindan, 1,2-dimethyl-5-aminoindan, 2,2-diethyl-5-aminoindan, 1-isopropyl-5-aminoindan, and the like. The ketones which may be employed include such compounds as benzophenone, acetophenone, benzoyl acetone, dibenzalacetone, hydroxy benzal acetone, benzoin, cyclohexanone, and the like, but preferably the aliphatic ketones such as acetone, methyl ethyl ketone, acetyl acetone, mesityl oxide, phorone, diacetone alcohol, hydroxyacetone, and the like. I particularly prefer the reaction products of the afore-mentioned aminoindans with acetone. The acetone need not be added as such to the reaction mixture, but may be added in the form of a suitable complex, such as mesityl oxide, phorone, the bisulfite addition product of acetone, acetone oxime, or the like, which will decompose under the conditions of the reaction to yield acetone.

The preparation of my new composition is carried out by heating a mixture of the ketones and the aminoindans in the presence of an acidic condensation catalyst. Although a diluent or a solvent may be added to the reaction mixture, this procedure is not necessary. An excess of either the aminoindan or the ketone reagent over that required for the reaction may be employed if desired. The excess reagent may be used as solvent or diluent for the reaction. The reaction may be carried out over a wide temperature range, from about 50° to 200° C., preferably from 100 to 150° C. and at either atmospheric or elevated pressure, depending upon the particular reagents used. Among the catalysts which may be employed are such materials as hydrogen chloride, phosphoric acid, sulfuric acid, sodium bisulfate, zinc chloride, aluminum chloride, boron trifluoride, hydrogen fluoride, stannic chloride, ammonium bromide, iodine, or other materials which either are acids or are capable of liberating acids upon hydrolysis or upon contact with organic substances.

The following specific examples will serve more fully to illustrate the nature of my invention:

Example I

The condensation product of 5-aminoindan with acetone was prepared by heating 39.9 parts by weight of 5-aminoindan together with 2.5 parts of hydrochloric acid to a temperature of about 120° C. There was introduced into the reaction vessel over a period of about four hours 104.4 parts of acetone. The reaction mixture was then cooled, and the hydrochloric acid neutralized with a dilute sodium carbonate solution. The oily reaction mixture was then washed with water, and the desired product, which was formed by the condensation of one molecular proportion of the aminoindan with two molecular proportions of the acetone with the elimination of two molecular proportions of water, was then separated from the excess of unreacted materials by fractional distillation. The product after recrystallization from hexane was a white crystalline solid melting at 76° to 78° C.

Example II

About 39.9 parts by weight of a mixture containing 60% 5-aminoindan and 40% 4-aminoindan was heated with 2.5 parts of hydrochloric acid, while passing into the reaction vessel over a period of about three hours, 104 parts of acetone. After cooling, the hydrochloric acid was neutralized with a dilute sodium carbonate solution. Because of the tendency of the product to form an emulsion, about 100 parts by weight of toluene was added, in which the product dissolved, and the solution was washed with water. The condensation product, which was formed by the condensation of one molecular proportion of the aminoindan with two molecular proportions of the acetone with the elimination of two molecular proportions of water, was separated from the solvent and from the unreacted reagent by fractional distillation. The product, a light-colored liquid which crystallized on standing, boiled at 102 to 116° C. at 1 mm.

Example III

The condensation product of one mol of 4-aminoindan with two mols of acetone was prepared by the method described in Example I. The product was a white crystalline solid melting at 106 to 108° C.

Although the precise chemical structure of the compounds described in the specific examples is not known, it is believed that they are trimethyl dihydroquinoline derivatives.

My new compositions are far superior in antioxidant properties to the condensation products of ketones with primary aromatic amines previously known. This superiority is shown by a comparison of the results obtained by using the products of the specific examples as antioxidants in rubber with the results obtained by using the condensation products of acetone with aniline as an antioxidant in the same rubber composition. The following rubber composition, in which the parts are by weight, was employed for the test:

| | |
|---|---:|
| Rubber | 100.0 |
| Zinc oxide | 5.0 |
| Sulfur | 3.0 |
| Carbon black | 50.0 |
| Stearic acid | 3.5 |
| Pine tar | 3.0 |
| 2-mercaptobenzothiazole | 1.0 |
| Antioxidant | 2.0 |

Portions of the composition containing various antioxidants were vulcanized for 60 minutes at 279° F. to produce an optimum cure, and the ultimate tensile strength and elongation were measured before and after aging the rubber for 96 hours in oxygen at 70° C. and 300 lbs. per sq. in. The table below shows the loss of tensile strength and elongation after aging:

| Antioxidant | Percent loss in tensile strength | Percent decrease in elongation |
|---|---|---|
| None | 77 | 48 |
| Condensation product of one mol of aniline with two mols of acetone | 51 | 28 |
| Product of Example I | 33 | 10 |
| Product of Example II | 32 | 25 |
| Product of Example III | 30 | 16 |

Although I have herein disclosed specific embodiments of my invention, I do not intend to limit myself solely thereto, but to include all of the obvious variations and modifications within the spirit and scope of the appended claims.

I claim:

1. The product obtained by condensing a ketone with a primary aminoindan in the presence of an acidic condensation catalyst, said aminoindan having the amino group directly attached to a carbon atom of the aromatic ring and having a hydrogen atom attached to at least one of the adjacent nuclear aromatic carbon atoms.

2. The product obtained by condensing an aliphatic ketone with a primary aminoindan in the presence of an acidic condensation catalyst, said aminoindan having the amino group directly attached to a carbon atom of the aromatic ring and having a hydrogen atom attached to at least one of the adjacent nuclear aromatic carbon atoms.

3. The product obtained by condensing acetone with a primary aminoindan in the presence of an acidic condensation catalyst, said aminoindan having the amino group directly attached to a carbon atom of the aromatic ring and having a hydrogen atom attached to at least one of the adjacent nuclear aromatic carbon atoms.

4. The product obtained by condensing 4-aminoindan with a ketone in the presence of an acidic condensation catalyst.

5. The product obtained by condensing 4-aminoindan with an aliphatic ketone in the presence of an acidic condensation catalyst.

6. The product obtained by condensing 4-aminoindan with acetone in the presence of an acidic condensation catalyst.

7. The product obtained by condensing 5-aminoindan with a ketone in the presence of an acidic condensation catalyst.

8. The product obtained by condensing 5-aminoindan with an aliphatic ketone in the presence of an acidic condensation catalyst.

9. The product obtained by condensing 5-aminoindan with acetone in the presence of an acidic condensation catalyst.

CARLIN F. GIBBS.